United States Patent [19]

Haun, Jr.

[11] 4,405,468
[45] Sep. 20, 1983

[54] PLACID SHALE WEIGHTING AGENT FOR WATER BASE DRILLING MUD

[76] Inventor: R. P. Haun, Jr., P.O. Box 712, Eastland, Tex. 76448

[21] Appl. No.: 243,032

[22] Filed: Mar. 12, 1981

[51] Int. Cl.$^3$ ............................................... C09K 7/04
[52] U.S. Cl. .................................................. 252/8.5 B
[58] Field of Search ......................... 252/8.5 B, 8.5 A

[56] References Cited

U.S. PATENT DOCUMENTS

| | | | |
|---|---|---|---|
| 2,515,207 | 7/1950 | Fisher | 252/8.5 |
| 2,724,696 | 11/1955 | Ratcliffe | 252/8.5 |
| 2,789,949 | 4/1957 | Scotty | 252/8.5 |
| 2,895,911 | 7/1959 | Van Dyke | 252/8.5 |
| 2,957,822 | 10/1960 | Frint | 252/8.5 |
| 2,981,630 | 4/1961 | Rowland | 106/288 |
| 3,046,221 | 7/1962 | Dodd | 252/8.5 |
| 3,079,333 | 2/1963 | Malone et al. | 252/8.5 |
| 3,185,642 | 5/1965 | Sawyer et al. | 252/8.5 |
| 3,691,070 | 9/1972 | Pippen | 252/8.5 |
| 3,951,824 | 4/1976 | Maxson et al. | 252/8.5 |
| 3,956,140 | 5/1976 | Nahm et al. | 252/8.5 |
| 3,962,099 | 6/1976 | Whitfill | 252/8.5 |
| 3,989,630 | 11/1976 | Walker | 252/8.5 |
| 4,033,893 | 7/1977 | Mondshine | 252/8.5 |

OTHER PUBLICATIONS

Rogers, Composition and Properties of Oil Well Drilling Fluids, Revised Ed. Pub. 1953, pp. 221 and 222.

*Primary Examiner*—Herbert B. Guynn
*Attorney, Agent, or Firm*—Dennis T. Griggs

[57] ABSTRACT

An improved water base drilling mud composition comprises a placid shale clay from strata of the Pennsylvanian system of the Paleozoic Era which consists essentially of chlorite, illite and kaolinite mineral components, including at least trace amounts of α-quartz, calcium carbonate and gypsum. The placid shale clay is characterized by a relatively low volatile matter content, typically six percent by weight. Additionally, it is characterized by a relatively high percentage by weight of high density compounds such as aluminum oxide ($Al_2O_3$) and a relatively small amount of low density compounds such as magnesium oxide (MgO) and sulfur trioxide ($SO_3$). The placid shale clay is preferably used in combination with a gel viscosifier such as bentonite. In addition to serving as a weighting agent for increasing the density of the mud, it has been discovered that the placid shale clay flocculates the bentonite which produces an increase in the viscosity of the mud.

2 Claims, No Drawings

4,405,468

PLACID SHALE WEIGHTING AGENT FOR WATER BASE DRILLING MUD

BACKGROUND OF THE INVENTION

1. Field of the Invention

The present invention relates to drilling fluids for use in well bores which traverse subterranean formations, and in particular to water base drilling mud compositions and weighting agents for such compositions.

2. Description of the Prior Art

In the drilling of holes for exploration and extraction of crude oil and natural gas, a high density clay-water slurry, called drilling mud, is circulated through the well bore. The drilling mud is pumped down the drill stem through the openings in the drill bit and upwardly through the annular space between the drill stem and the walls of the bore to the surface of the earth. The principal purpose for introducing the drilling mud into the bore hole is to transport the cuttings produced by the drill bit to the surface of the earth. The drilling mud also lubricates the bit and the drill stem, transfers heat from the drill bit and develops a hydrostatic pressure head to prevent flow into the well hole of formation fluid such as oil, gas and water from the various strata penetrated by the drill bit.

To provide the proper hydrostatic pressure, the specific gravity of the mud is increased by adding a weighting agent such as barite. Such weighting agents increase the density of the mud and help control subsurface pressures and support the walls of the well bore. Viscosifying clays such as bentonite are added to increase the capacity of the mud for suspending the weighting material and transporting the drill cuttings. Sodium montmorillonite (bentonite) is the most important viscosifier in fresh water muds. A water slurry of bentonite has a relatively low viscosity and is free flowing, but when agitation or circulation is halted, the slurry sets or gels. Bentonite gel formation is rapid enough to permit the cuttings to fall only a short distance before the gel structure is sufficiently strong enough to support them.

Although the mud must be sufficiently viscous to carry the cuttings from the well bore and suspend particles of the weighting agent, the mud viscosity must not be so high as to interfere with the action of the pumps which circulate the drilling fluid in the formation. Thus, in the selection of a viscosifier gel and a weighting agent for a water base mud, the resulting mud slurry must be able to seal off the strata and develop the requisite hydrostatic pressure to prevent a blow-out. To provide the proper hydrostatic pressure, the specific gravity of the mud must be increased by adding a material heavier than the gel material. On the other hand, the drilling fluid must have the proper viscosity and be thick enough to carry off the cuttings, but be thin enough to be pumped and to allow the coarse cuttings to settle out in the surface mud pits so that the mud can be recycled.

In addition to the foregoing considerations, it is desirable to minimize the solids concentration in the mud to obtain maximum bit penetration rate. Therefore, the mud is generally made up with the highest yield clay available. Bentonite is the most important of such clays and typically yields 90 to 100 bbl/ton in fresh water.

The drilling penetration rate diminishes as the number of solid particles in a drilling mud increases. The combination of barite and bentolite in water base muds minimizes the solids concentration while developing the required viscosity and density. Although both bentonite and barite are presently available in commercial quantities, barite is relatively scarce and expensive. Thus, there is a continuing interest in developing high yield clays and weighting agent substitutes for barite.

SUMMARY OF THE INVENTION

According to the present invention, I have discovered a unique clay for use in combination with a gel viscosifier such as bentonite which has a relatively high yield and which materially reduces the amount of bentonite required and eliminates the need for an additional weighting agent such as barite. The discovered clay is a placid shale which is found in Eastland County, Texas from strata of the Pennsylvania system of the Paleozoic Era. This placid shale clay is characterized by its uniformity with depth, lack of thin bedding planes, low content of calcareous and sulfur bearing compounds, excellent dry strength, and uniformity of texture. X-ray diffraction analysis of this placid shale clay discloses its principal mineral components as being chlorite, illite and kaolinite in the minus 2-micron fraction. Other components disclosed are $\alpha$-quartz, organic matter and trace amounts of calcium carbonate and gypsum.

The placid shale clay is characterized by a relatively low volatile matter content, typically 6.13% by weight. It is further characterized by a relatively high percentage by weight of high density compounds such as aluminum oxide, iron oxide and a relatively small amount of low density compounds such as magnesium oxide and sulfur trioxide. When used in combination with a gel viscosifier such as bentonite, it has been discovered that the placid shale clay flocculates the bentonite which produces an increase in the viscosity of the mud, thereby reducing the amount of bentonite needed for a given viscosity while increasing the mud weight.

DETAILED DESCRIPTION OF A PREFERRED EMBODIMENT

The drilling fluid composition of this invention is a mixture of water, a gel viscosifier, and a placid shale clay from strata of the Pennsylvania system of the Paleozic Era which consists essentially of chlorite, illite and kaolinite mineral components, having a relatively low volatile matter content, typically six percent (6%) by weight. The mineral components of the clay are characterized by the following analysis:

| Mineral Compound | % By Weight |
| --- | --- |
| chlorite | 7% |
| illite | 62% |
| kaolinite | 31% |

The placid shale clay is characterized by the following chemical analysis:

| Component | % By Weight | % By Weight (volatile free) |
| --- | --- | --- |
| Silicon dioxide, $SiO_2$ | 65.07% | 69.32% |
| Iron oxide, $Fe_2O_3$ | 5.78% | 6.15% |
| Aluminum oxide, $Al_2O_3$ | 16.75% | 17.24% |
| Calcium oxide, $CaO$ | 1.12% | 1.19% |
| Magnesium oxide, $MgO$ | 2.08% | 2.22% |
| Sulfur trioxide, $SO_3$ | 1.29% | 1.37% |
| Sodium oxide, $Na_2O$ | 0.42% | 0.47% |
| Potassium oxide, $K_2O$ | 1.36% | 1.44% |

| Component | % By Weight | % By Weight (volatile free) |
|---|---|---|
| Volatiles | 6.13% | — |

The preferred water base drilling mud comprises a mixture of water, bentonite gel, and processed placid shale clay. The placid shale clay is characterized by a pH of 8.0, a calcium hardness of 40 ppm, chlorides ppm of 100 and salt ppm of 165.

The term "processed", as used herein, means that the shale clay is dug from its natural state and then ground until approximately 90% will pass a 40 mesh sieve (40 openings per square inch).

EXAMPLE

A gel slurry (25 lbs. per barrel of bentonite) having a weight of 8.6 ppg, when mixed with 100 lbs. per barrel of processed placid shale clay provides a mud having a weight of 9.9 ppg. The same slurry weight had previously been obtained with barite in the amount of 75 lbs. per barrel to produce a mud having a weight of 9.9 lbs. per gallon from 8.6 lbs. per gallon bentonite gel slurry. The data obtained in this comparison are given in Tables I and II.

TABLE I

| | Mud No. 1 | Mud No. 2 | Mud No. 3 | Mud No. 4 |
|---|---|---|---|---|
| $H_2O$ | 700 nl | 700 nl | 700 nl | 700 nl |
| Gel (Bentonite) | 25 ppb | 25 ppb | 25 ppb | 25 ppb |
| Placid Shale Sample | | 50 ppb | 100 ppb | |
| Barite | | | | 75 ppb |
| Shear Rate | | | | |
| 600 RPM | 29 gdf | 46 gdf (stress) | | |
| 300 RPM | 17 gdf | 27 gdf (stress) | | |
| A.V. cps | 9 | 13 | | |
| P.V. cps | 12 | 19 | | |
| Y.P. lbs/100 ft$^2$ | 5 | 8 | | |
| Gels: initial/10 min. | 9/28 | 13/38 | | |
| pH | 8.0 | 8.0 | | |
| API Filtrate, mls. | 19.2 | 13.6 | | |
| Filter cake* | 5/32 in. | 5/32 in. | | |
| | *(both samples have thick and spongy filter cake) | | | |
| Pf/Mf | 0/.2 | 0/.4 | | |
| Pm | TR-.05 | TR-.05 | | |
| Chlorides, ppm | 50 | 150 | | |
| Calcium, ppm | 0 | 40* | | |
| | *(shows small % of calcium) | | | |
| Mud Weight, ppg | 8.6 | 9.3 | 9.9 | 9.9 |
| % Solids | 2.025 | 7.275 | | |
| % Oil | 0 | 0 | | |
| % Water | 97.975 | 92.725 | | |

TABLE II

| Additives | Mud No. 1 | Mud No. 2 |
|---|---|---|
| Water | 700 ml | 700 ml |
| Bentonite | 20 ppb | 20 ppb |
| Placid Shale Sample | 25 ppb | 50 ppb |
| Sheat Rate | | |
| 600 RPM | 16.5 gdf | 19.0 gdf (stress) |
| 300 RPM | 11.0 gdf | 13.5 gdf (stress) |
| Apparent Viscosity | 8.25 cps | 9.5 cps |
| Plastic Viscosity | 5.5 cps | 5.5 cps |
| Yield Point | 5.5 #/100 ft$^2$ | 8.0 #/100 ft$^2$ |
| Gels | 3.5 gdf | 6.0 gdf |
| pH | 8.0 | 8.5 |
| API Filtrate | 24.2 ml | 22.9 ml |
| Mud Cake | 29.5 mm | 30.5 mm |
| Chlorides | | 143 ppm |
| Calcium | | 42 ppm |
| Mud Weight | 9.0 ppg | 9.35 ppg |
| % Solids | 1.5% | 2.1% |
| % Water | 98.5% | 97.9% |

The data indicate excellent rheological and stabilization characteristics for drilling mud purposes.

What is claimed is:

1. A drilling mud comprising a slurry mixture of water, a gel viscosifier, and a dispersed clay as a weighting agent consisting essentially of chlorite, illite and kaolinite mineral components, said drilling mud having a solids concentration in the range of 1.5% to 7.27%, said mineral components being present in the following amounts:

| Mineral Component | Approximate % By Weight |
|---|---|
| chlorite | 7% |
| illite | 62% |
| kaolinite | 31% | and said clay being characterized by the following analysis:

| Component | Approximate % By Weight | Approximate % By Weight (volatile free) |
|---|---|---|
| Silicon dioxide, $SiO_2$ | 65.07% | 69.32% |
| Iron oxide, $Fe_2O_3$ | 5.78% | 6.15% |
| Aluminum oxide, $Al_2O_3$ | 16.75% | 17.24% |
| Calcium oxide, CaO | 1.12% | 1.19% |
| Magnesium oxide, MgO | 2.08% | 2.22% |
| Sulfur troxide, $SO_3$ | 1.29% | 1.37% |
| Sodium oxide, $Na_2O$ | 0.42% | 0.47% |
| Potassium oxide, $K_2O$ | 1.36% | 1.44% |
| Volatiles | 6.13% | — |

2. The drilling mud as defined in claim 1 wherein: said clay includes in at least trace amounts α-quartz, calcium carbonate and gypsum.

* * * * *